US009076036B2

(12) United States Patent
Hirano et al.

(10) Patent No.: US 9,076,036 B2
(45) Date of Patent: Jul. 7, 2015

(54) VIDEO SEARCH DEVICE, VIDEO SEARCH METHOD, RECORDING MEDIUM, AND PROGRAM

(71) Applicant: Rakuten, Inc., Shinagawa-ku, Tokyo (JP)

(72) Inventors: Hiromi Hirano, Shinagawa-ku (JP); Masahiro Sanjo, Shinagawa-ku (JP); Yuta Kawate, Chofu (JP); Makoto Okabe, Chofu (JP); Rikio Onai, Chofu (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/240,284

(22) PCT Filed: Oct. 12, 2012

(86) PCT No.: PCT/JP2012/076480
§ 371 (c)(1),
(2) Date: Feb. 21, 2014

(87) PCT Pub. No.: WO2013/108448
PCT Pub. Date: Jul. 25, 2013

(65) Prior Publication Data
US 2014/0205148 A1    Jul. 24, 2014

(30) Foreign Application Priority Data
Jan. 20, 2012  (JP) ................................. 2012-010492

(51) Int. Cl.
*G06K 9/00* (2006.01)
*H04N 5/76* (2006.01)
(Continued)

(52) U.S. Cl.
CPC .............. *G06K 9/00523* (2013.01); *H04N 5/76* (2013.01); *G06F 17/30811* (2013.01);
(Continued)

(58) Field of Classification Search
USPC ......................................................... 382/103
See application file for complete search history.

(56) References Cited

U.S. PATENT DOCUMENTS 7,804,981 B2 *  9/2010  Viggiano et al. .............. 382/104
8,638,983 B2 *  1/2014  Chang et al. .................. 382/103
(Continued)

FOREIGN PATENT DOCUMENTS

JP    2001-134589 A    5/2001

OTHER PUBLICATIONS

David G. Lowe, "Object Recognition from Local Scale-Invariant Features", Proc. Of the International Conference of Computer Vision, IEEE International Conference on Computer Vision, Sep. 1998, pp. 1150-1157.

(Continued)

*Primary Examiner* — Yon Couso
(74) *Attorney, Agent, or Firm* — Sughrue Mion, PLLC

(57) ABSTRACT

A video search device for video searches in which a user specifies the position and orientation of an object that should appear in a video. A receiver receives input of a still image, two reference positions in the still image and two target positions in a video frame. An extractor extracts a reference image containing the two reference positions from the still image. A searcher searches for similar frame images in which local images similar to the reference image are depicted, from frame images in the video, traces movement tracks of two noteworthy pixels at start positions corresponding to the two reference positions in a local image when time advances or regresses from a similar frame image in the video, searches for a target frame image where the two movement tracks approach two target positions, and produces videos containing the similar frame image and the target frame image.

8 Claims, 21 Drawing Sheets

(51) Int. Cl.
*G06F 17/30* (2006.01)
*G06T 7/20* (2006.01)
*G06K 9/36* (2006.01)

(52) U.S. Cl.
CPC .......... *G06F 17/3079* (2013.01); *G06T 7/204* (2013.01); *G06F 17/30825* (2013.01); *G06K 9/00711* (2013.01); *G06K 2009/366* (2013.01)

(56) References Cited

U.S. PATENT DOCUMENTS

| | | | |
|---|---|---|---|
| 2010/0080415 A1* | 4/2010 | Qureshi et al. | 382/103 |
| 2013/0235208 A1* | 9/2013 | Hirano | 348/157 |

OTHER PUBLICATIONS

Dan B. Goldman et al., "Video Object Annotation, Navigation, and Composition", UIST 2008, Proc. ACM symposium on User Interface Software and Technology, pp. 3-12, ACM 978-1-59593-975-3/08/10, http://www.danbgoldman.com/uw/papers/ivoa.uist08.pdf., Oct. 1-22, 2008.

Navneet Dalal et al., "Histograms of Oriented Gradients for Human Detection", IEEE Computer Society Conference on Computer Vision and Pattern Recognition, 2005, pp. 886-893.

Peter Sand et al., "Particle Video: Long-Range Motion Estimation Using Point Trajectories", International Journal of Computer Vision, 2008, pp. 72-91, vol. 80, No. 1.

* cited by examiner

VIDEO SEARCH DEVICE, VIDEO SEARCH METHOD, RECORDING MEDIUM, AND PROGRAM

CROSS REFERENCE TO RELATED APPLICATIONS

This application is a National Stage of International Application No. PCT/JP2012/076480 filed Oct. 12, 2012, claiming priority based on Japanese Patent Application No. 2012-010492, filed Jan. 20, 2012, the contents of all of which are incorporated herein by reference in their entirety.

TECHNICAL FIELD

The present invention relates to a video search device, video search method, recording medium and program for accomplishing video searches by enabling a user to easily specify an object that should appear in videos, along with the position, orientation and movement thereof.

BACKGROUND ART

Previously, the SIFT (Scale Invariant Feature Transformation) disclosed in Non Patent Literature 1 and the HOG (Histograms of Oriented Gradients) disclosed in Non Patent Literature 2 have been proposed as art for recognizing objects depicted in still images and the characteristic points thereof. By applying this art, it is easy to determine whether or not the external appearance of objects depicted in two still images are similar, even if the objects are rotated, the magnification ratio differs or the luminosity differs. In addition, by applying the aforementioned art after reversing the object image showing the depicted object, it is possible to determine that images are similar even when the mirror image of the object is depicted.

On the other hand, Particle Video is proposed in Non Patent Literatures 3 and 4 as art for tracing movement of an object in a video. By applying this art, it is possible to acquire in what position a given location on the surface of an object in the real world is depicted in each frame image included in the video, and it is possible to identify a track of movement including that depicted position. That is to say, with this art, it is possible to identify a track expressing how a given pixel in a given frame image moves with the forward or retrograde progress of time.

Furthermore, art for searching other videos similar to the video specified by the user are proposed in Patent Literature 1.

CITATION LIST

Patent Literature

Patent Literature 1: Unexamined Japanese Patent Application Kokai Publication No. 2001-134589.

Non Patent Literature

Non Patent Literature 1: D. G. Lowe, Object recognition from Local Scale-Invariant Features, Proceedings of IEEE International Conference on Computer Vision, pp. 1150-1157, 1999.
Non Patent Literature 2: N. Dalal and B. Triggs, Histograms of Oriented Gradients for Human Detection, Proceedings of IEEE Computer Society Conference on Computer Vision and Pattern Recognition, pp. 886-893, 2005.
Non Patent Literature 3: Peter Sand and Seth Teller, Particle Video: Long-Range Motion Estimation using Point Trajectories, International Journal of Computer Vision, vol. 80, no. 1, pp. 72-91, Springer, 2008.
Non Patent Literature 4: Dan B. Goldman, Chris Gonterman, Brian Curless, David Salesin and Steven M. Seitz, Video Object Annotation, Navigation and Composition, UIST 2008, Proc. ACM symposium on User Interface Software and Technology, pp. 3-12, ACM 978-1-59593-975-3/08/10, http://www.danbgoldman.com/uw/papers/ivoa.uist08.pdf, 2008.

SUMMARY OF INVENTION

Technical Problem

However, when doing video searches, the demand that users want to be able to easily specify information such as the outward appearance, position, orientation and/or the like of an object depicted in the video remains great.

In particular, when a still image in which the desired object is depicted has already been prepared, there is the demand that users want to be able to easily specify the position and orientation when that object appears in the video, using that still image.

Even in videos in which an object shot in a different shooting direction or with a position or orientation differing from the orientation of the objected depicted in the still image appears, there is the strong demand that users want to be able to obtain such as search results.

In consideration of the foregoing, it is an objective of the present invention to provide a video search device, video search method, recording medium and program for accomplishing video searches such that it is possible for a user to easily specify an object that should appear in videos, along with the position, orientation and furthermore movement thereof.

Solution to Problem

The video search device according to a first aspect of the present invention comprises:
a receiver for receiving input of a still image in which a reference object is depicted, a first reference position and a second reference position contained in a reference region in which the reference object in the still image is depicted, and a first target position and a second target position within a frame image contained in a video;
an extractor for extracting a reference image depicted in the reference region based on the first reference position and the second reference position; and
a searcher for searching for, out of multiple videos, similar frame images that are frame images contained in the videos and in which local images similar to the reference image are depicted, finding a first start position and a second start position corresponding to the first reference position and the second reference position in the reference region, in a local region in which the local image is depicted in the searched similar frame image, tracing a first movement track along which a first noteworthy pixel depicted at the first start position moves in the searched similar frame image and a second movement track along which a second noteworthy pixel depicted at the second start position moves, by scanning frame images contained in the video including the searched similar frame image in the chronological progress or retrogression direction from the searched similar frame image, searching a target frame image at which the first movement track reaches the neighborhood of the first target position and the second movement track reaches the neighborhood of the second target position, and producing as a search result a video including the searched similar frame image and the searched target frame image.

In addition, in the video search device of the present invention, it is possible to have a composition such that:

the receiver further receives input of a target track in a frame image including the video; and the searcher, for each of the searched videos, traces a representative track along which a representative pixel of a local image depicted in the searched target frame image moves, by scanning frame images contained in the searched video in the chronological direction from a target frame image included in the video, and produces as the search result a video in which the target track and the representative track are similar.

In addition, in the video search device of the present invention, it is possible to have a composition such that the searcher, for each of the searched videos, traces a representative track along which a representative pixel of a local image depicted in the searched target frame image moves, by scanning frame images contained in the searched video in the chronological direction from a target frame image included in the video, and produces as the search result the representative track of those videos along with those videos.

In addition, in the video search device of the present invention, it is possible to have a composition such that:

the extractor obtains image characteristic amounts for the reference image; and the searcher searches for the similar frame images by searching for frame images having image characteristic amounts similar to the image characteristic amounts of the reference image.

In addition, in the video search device of the present invention, it is possible to have a composition such that:

the extractor further obtains image characteristic amounts of a mirror image that is a reversal of the reference image; and the searcher searches for the similar frame images by searching for frame images similar to the image characteristic amounts of the reference image or the image characteristic amounts of the mirror image.

The video search method according to a second aspect of the present invention comprises the steps of:

receiving input of a still image in which a reference object is depicted, a first reference position and a second reference position contained in a reference region in which the reference object in the still image is depicted, and a first target position and a second target position within a frame image contained in a video;

extracting a reference image depicted in the reference region based on the first reference position and the second reference position; and searching for, out of multiple videos, similar frame images that are frame images contained in the videos and in which local images similar to the reference image are depicted, finding a first start position and a second start position corresponding to the first reference position and the second reference position in the reference region, in a local region in which the local image is depicted in the searched similar frame image, tracing a first movement track along which a first noteworthy pixel depicted at the first start position moves in the searched similar frame image and a second movement track along which a second noteworthy pixel depicted at the second start position moves, by scanning frame images contained in the video including the searched similar frame image in the chronological progress or retrogression direction from the searched similar frame image, searching a target frame image at which the first movement track reaches the neighborhood of the first target position and the second movement track reaches the neighborhood of the second target position, and producing as a search result a video including the searched similar frame image and the searched target frame image.

The computer-readable recording medium according to a third aspect of the present invention is comprised so as to record a program that causes a computer to function as:

a receiver for receiving input of a still image in which a reference object is depicted, a first reference position and a second reference position contained in a reference region in which the reference object in the still image is depicted, and a first target position and a second target position within a frame image contained in a video;

an extractor for extracting a reference image depicted in the reference region based on the first reference position and the second reference position; and a searcher for searching for, out of multiple videos, similar frame images that are frame images contained in the videos and in which local images similar to the reference image are depicted, finding a first start position and a second start position corresponding to the first reference position and the second reference position in the reference region, in a local region in which the local image is depicted in the searched similar frame image, tracing a first movement track along which a first noteworthy pixel depicted at the first start position moves in the searched similar frame image and a second movement track along which a second noteworthy pixel depicted at the second start position moves, by scanning frame images contained in the video including the searched similar frame image in the chronological progress or retrogression direction from the searched similar frame image, searching a target frame image at which the first movement track reaches the neighborhood of the first target position and the second movement track reaches the neighborhood of the second target position, and producing as a search result a video including the searched similar frame image and the searched target frame image.

The program according to a fourth aspect of the present invention is comprised so as to cause a computer to function as:

a receiver for receiving input of a still image in which a reference object is depicted, a first reference position and a second reference position contained in a reference region in which the reference object in the still image is depicted, and a first target position and a second target position within a frame image contained in a video;

an extractor for extracting a reference image depicted in the reference region based on the first reference position and the second reference position; and a searcher for searching for, out of multiple videos, similar frame images that are frame images contained in the videos and in which local images similar to the reference image are depicted, finding a first start position and a second start position corresponding to the first reference position and the second reference position in the reference region, in a local region in which the local image is depicted in the searched similar frame image, tracing a first movement track along which a first noteworthy pixel depicted at the first start position moves within the searched similar frame image and a second movement track along which a second noteworthy pixel depicted at the second start position moves, by scanning frame images contained in the video including the searched similar frame image in the chronological progress or retrogression direction from the searched similar frame image, searching a target frame image at which the first movement track reaches the neighborhood of the first target position and the second movement track reaches the neighborhood of the second target position, and producing as a search result a video including the searched similar frame image and the searched target frame image.

It is possible to record the program of the present invention on a computer-readable non-transitory recording medium such as a compact disc, a flexible disk, a hard disk, an magneto-optical disc, a digital video disc, magnetic tape, semiconductor memory and/or the like. In addition, it is possible for such recording media to be distributed and sold independently of a computer.

In addition, it is possible for the program of the present invention to be loaded from the above-described recording medium into a recording medium readable and writable by a computer, such as RAM (Random Access Memory) and/or the like, and be temporarily stored, and for a CPU (Central Processing Unit) to read, interpret and execute the program recorded in the RAM and/or the like.

Furthermore, it is possible for the program of the present invention to be distributed and sold via a transitory transmission medium such as a computer communication network and/or the like, independent of the computer that executes the program.

Advantageous Effects of Invention

With the present invention, it is possible to provide a video search device, video search method, recording medium and program for accomplishing video searches such that it is possible for a user to easily specify an object that should appear in videos, along with the position, orientation and furthermore movement thereof.

DESCRIPTION OF EMBODIMENTS

Figure 1A:
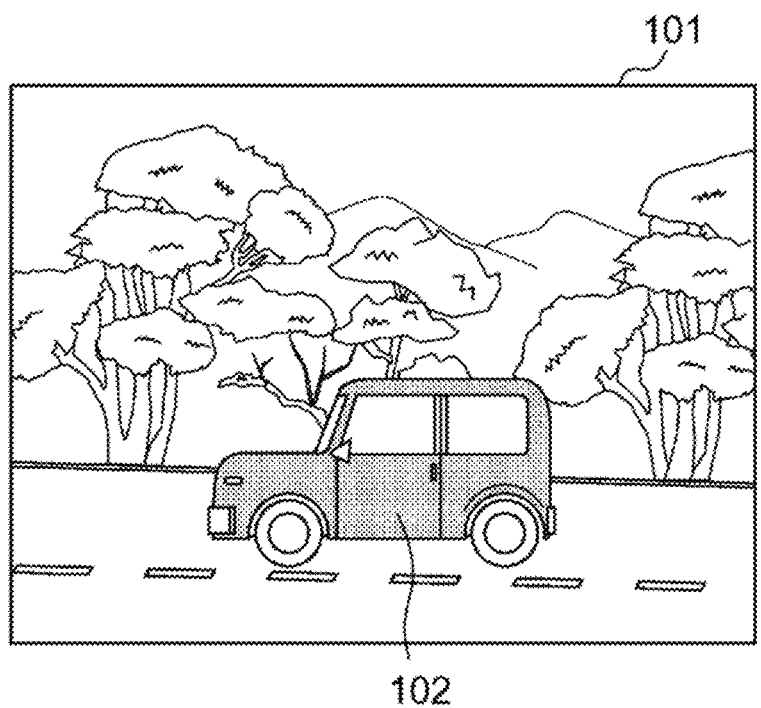
FIG. 1A is an explanatory drawing showing an example of a still image in which a reference object is depicted.

Below the preferred embodiment of the present invention is explained. However, this preferred embodiment is intended to be illustrative and not limiting to the scope of the present invention. Accordingly, the preferred embodiment may be modified in arrangement and detail without departing from the principles disclosed herein and that it is intended that the application be construed as including all such modifications and variations insofar as they come within the spirit and scope of the subject matter disclosed herein.

Embodiment 1

It is possible for a video search device according to the present invention to be realized by executing a prescribed program in various computers, such as a server computer or a personal computer, and/or the like.

A computer is hardware for receiving instructions from a user through an input device such as a keyboard, a mouse and/or the like, outputting results of processes to an output device such as a display and/or the like, and accomplishing the above-described input and output by communicating with other equipment via a NIC (Network Interface Card), by the CPU executing a program using RAM as a temporary memory region or output designation for process results, and it is also possible to appropriately omit equipment for input and output.

A program executed by the CPU and a database in which are stored records expressing various types of information that is the target of processing by the CPU are recorded on a hard disk drive and/or the like of the computer. The CPU accomplishes processes such as searching records matching a search query from the database and appending new records to the database.

In this preferred embodiment, in addition to multiple videos, local information from which the various frame images contained in the video are considered as still images are recorded in the database.

In addition, it is also possible to speed up the processes of the video search device according to the present invention by having multiple computers, connected via a computer communication network such as dedicated connection lines, communication circuits, the Internet and/or the like, execute the above-described process in parallel, decentralized and concurrently.

Besides this, it is also possible to realize the video search device of the present invention by creating an electronic circuit design from programs through application of technology such as FPGA (Field Programmable Gate Array) and/or the like and organizing special electronic circuits based on this design.

(Video Search Method)

With this preferred embodiment, the user specifies what kind of video is to be obtained by specifying various information along with still images. Below, methods for specifying such information will be explained first.

With this preferred embodiment, the user specifies the desired position and desired orientation of the desired object in the screen frame. Furthermore, the video search device searches for videos in which appear objects (hereafter called "target objects") resembling the object (hereafter called the "reference object") having the desired orientation at the desired location.

Thinking of this in comparison to document searches, the reference object corresponds to the character string that is the search key and the target objects correspond to character strings appearing in the document obtained as a result of accomplishing the search.

In a document search, it is possible to search for documents in which character strings perfectly matching the search key appear and it is also possible to search for documents in which character strings similar to the search key (having various conditions, such as synonyms or variations in spelling) appear. That is to say, the search key and character strings appearing in character strings that are search results do not necessarily match.

Similarly, with this preferred embodiment, the user specifies as a search key a reference object depicted in a still image, a desired location and a desired orientation.

Whereupon, the video search device searches for videos in which a target object resembling the reference object appears in the desired position with the desired orientation.

In order to facilitate understanding, below the explanation will use an automobile as an example of an object.

First, the user inputs one still image in which the reference object corresponding to the search key is depicted, using, for example, an image search engine and/or the like.

FIG. 1A is an explanatory drawing showing an example of a still image in which a reference object is depicted.

As shown in this drawing, an automobile 102 that is the reference object is depicted in the still image 101. In this drawing, the automobile 102 is depicted facing left in the center of the image. That is to say, the still image 101 was obtained by photographing the automobile 102 from a camera positioned directly to the left as viewed from the driver of the automobile 102.

Below, to facilitate understanding the region where the reference object is depicted in the still image is called the reference region and the image depicted in this reference region is called the reference image.

Figure 1B:
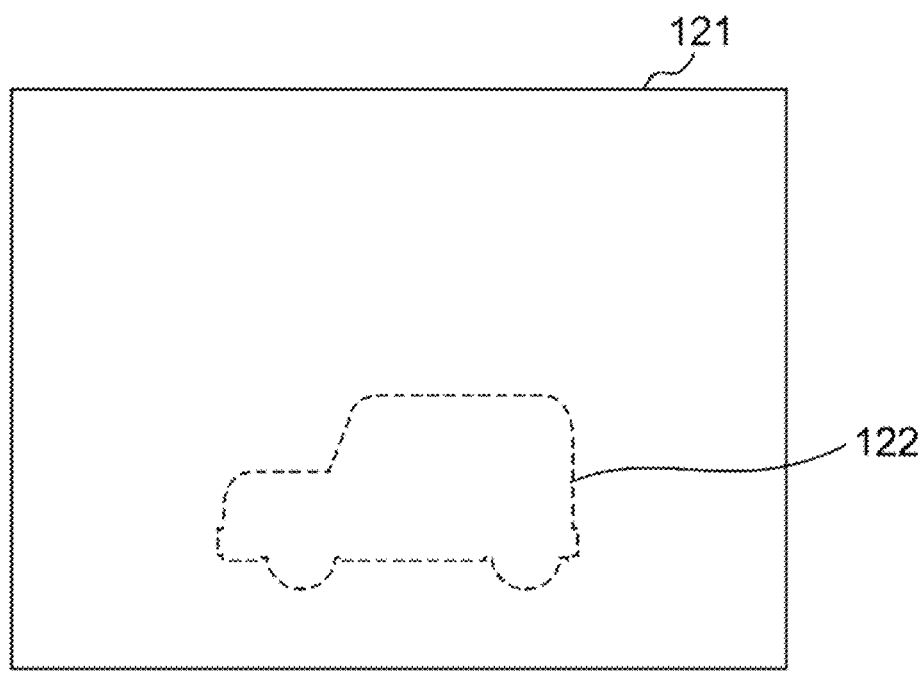
FIG. 1B is an explanatory drawing showing the condition of a reference region in the still image.
Figure 1C:
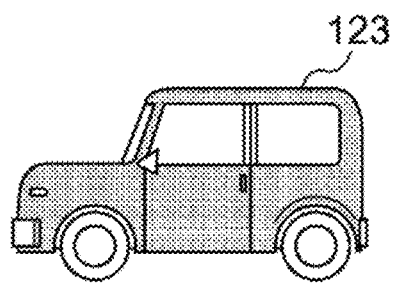
FIG. 1C is an explanatory drawing showing the condition of a reference image.

FIG. 1B is an explanatory drawing showing the condition of the reference region within the still image 101, and FIG. 1C is an explanatory drawing showing the condition of the reference image. These are explained below with reference to the drawings.

In FIG. 1B, a reference region 122 surrounded by a dotted line is shown within an entire region 121 of the still image 101. The entire region 121 corresponds to the still image 101 as a whole, and the reference region 122 corresponds to the region where the automobile 102 (the reference object) is depicted in the still image 101.

FIG. 1C shows a reference image 123 with the external appearance of the automobile 102 (reference object) alone cut out from the still image 101. In this preferred embodiment, a search is made for a video in which a target object resembling the reference object expressed by the reference image 123 appears.

As described above, the user specifies as search keys a desired position and a desired orientation. Below, the explanation is for an example in which the user has specified the upper right of the screen frame as the desired position and downward to the left as the desired orientation.

In this example, it is considered that the user wants as search results videos in which a target object resembling the reference object appears in the upper right of the screen frame with an orientation downward to the left.

Figure 2A:
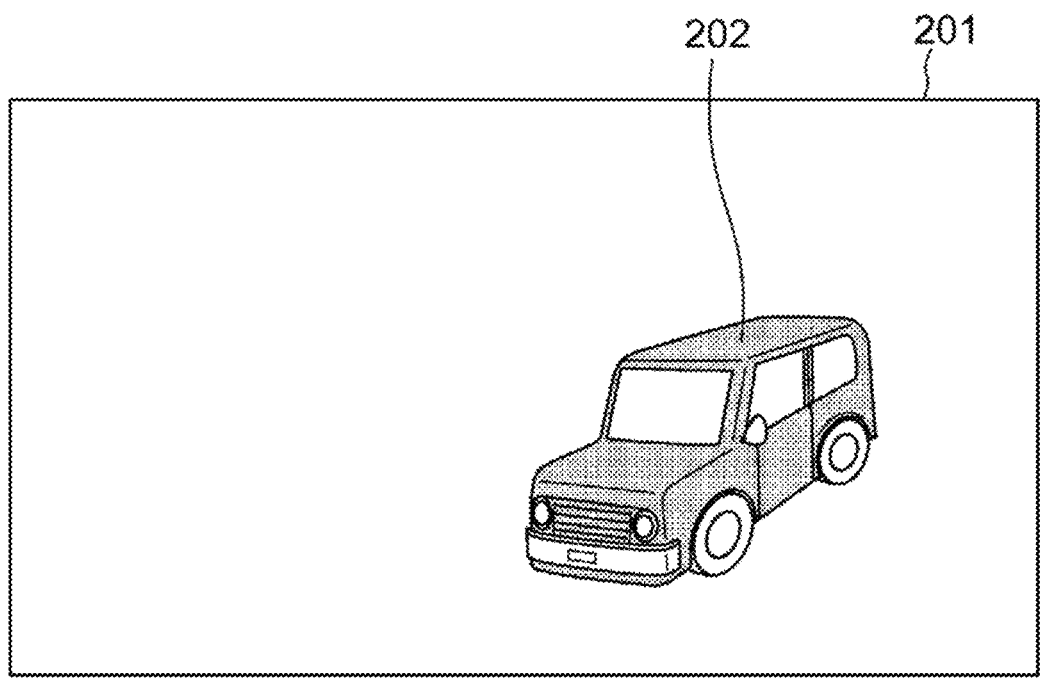
FIG. 2A is an explanatory drawing showing an example of the position and orientation where a target object should be positioned in a frame image included in a video.

FIG. 2A is an explanatory drawing showing an example of the position and orientation where the target object should be positioned in the frame image contained in the video. The explanation below makes reference to this image.

In the example shown in this drawing, an automobile 202 resembling this automobile 102 (which may be the same as the automobile 102) is depicted as the target object in the frame image 201 thought to be for which the user wants to search.

That is to say, with this preferred embodiment, videos that include the frame image 201 in which the target object (automobile 202) resembling the reference object (automobile 102) depicted in the still image 101 appear are search result candidates.

In the frame image 201, the automobile 202 appears in the upper right of the screen frame facing downward to the left. That is to say, the desired video is a video including an instant in which the automobile 202 was photographed by a camera positioned to the front and looking downward to the left as viewed from the driver of the automobile 202.

To facilitate understanding below, the region where the target object is depicted in the frame image is called the local region and the image depicted in this local region is called the local image.

Figure 2B:
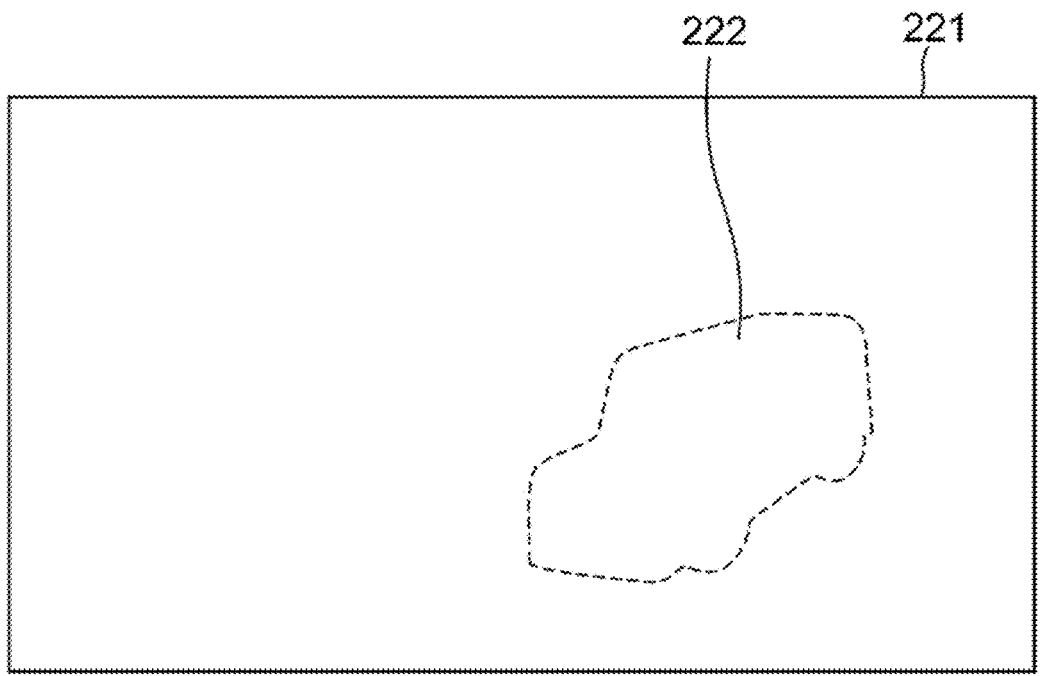
FIG. 2B is an explanatory drawing showing the condition of a local region in the frame image.
Figure 2C:
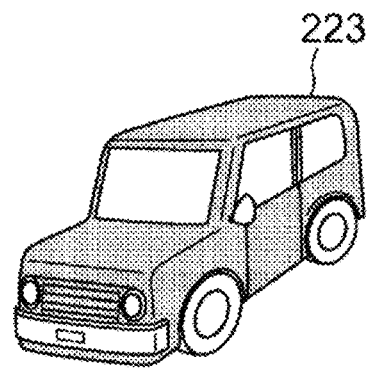
FIG. 2C is an explanatory drawing showing the condition of a local image.

FIG. 2B is an explanatory drawing showing the condition of the local region in the frame image 201, and FIG. 2C is an explanatory drawing showing the condition of the local image. The explanation below makes reference to these images.

In FIG. 2B, a target region 222 enclosed by a dotted line is shown in the entire region 221 of the frame image 201. The entire region 221 corresponds to the frame image 201 as a whole and the target region 222 corresponds to the region in which the automobile 202 (target object) is depicted within the frame image 201.

FIG. 2C shows the target image 223 as the external appearance of the automobile 202 (target object) cut out from the frame image 201.

With this preferred embodiment, a video is searched such that the reference object expressed by the reference image 123 and the target object expressed by the target image 223 are similar.

However, the still image 101 is the automobile 102 photographed from the left side, so it is not possible to obtain a composition similar to the target object 223 even implementing affine transformations including rotation, reversal, planar shifts, enlargement/reduction, shearing and/or the like of the reference image 123.

In this example, while the front of the automobile 102 clearly cannot be seen in the still image 101, the front of the automobile 202 can be seen well in the frame image 201.

In general, if image search art is used, it is not impossible to obtain a still image in which the reference object desired by the user appears.

However, there are virtually no cases in which the position and orientation with which the reference object is depicted in that still image along with the shooting direction and angle of the reference object match as-is the position and orientation with which the target object is depicted in the frame image contained in the video along with the shooting direction and angle of the target object.

Hence, with this preferred embodiment, the user specifies a correspondence relationship between the reference image in the still image 101 and the target image in the frame image 201.

Figure 3:
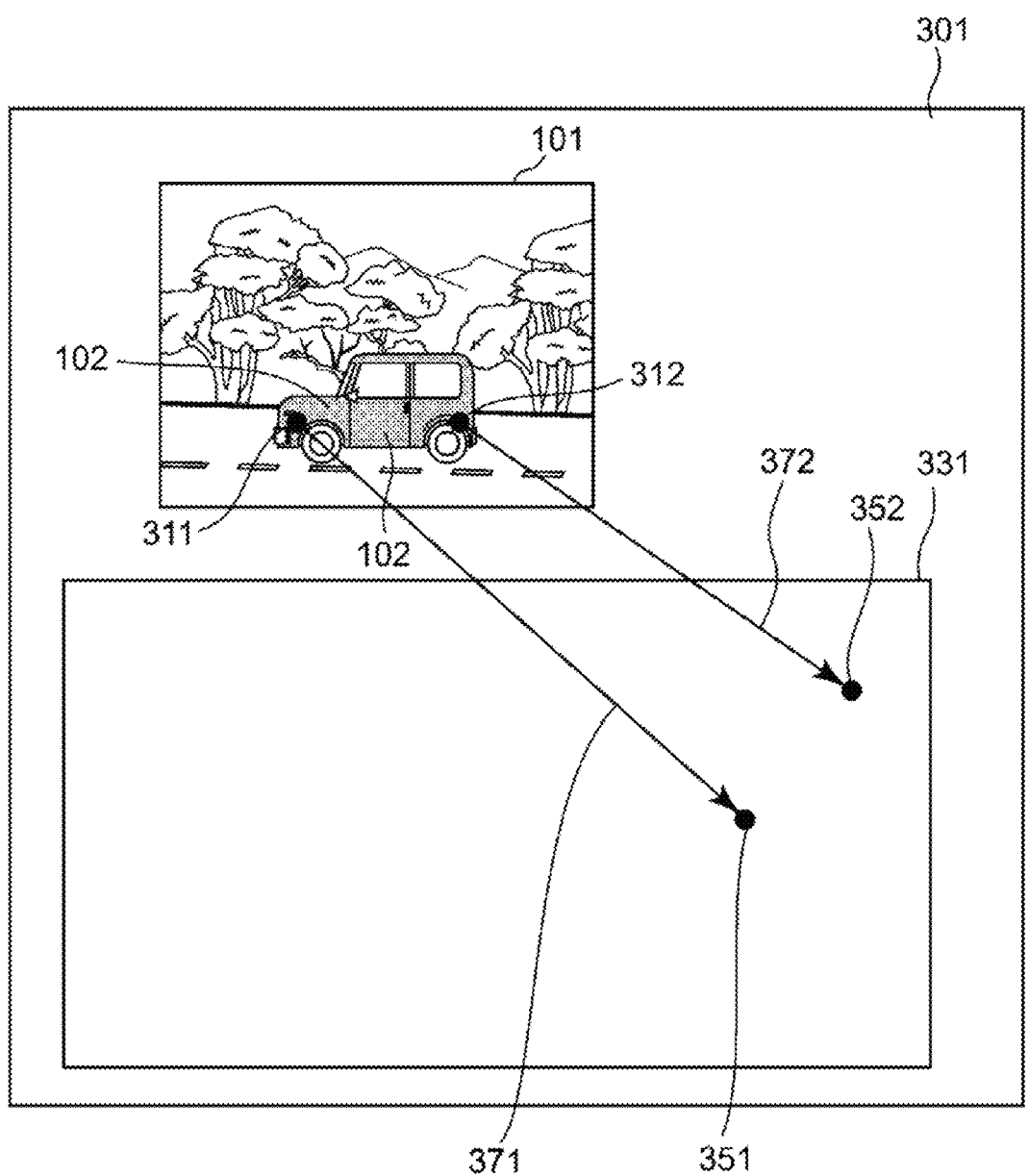
FIG. 3 is an explanatory drawing showing the condition in which a user specifies the correspondence relationship between the reference image and the target image.
Figure 4:
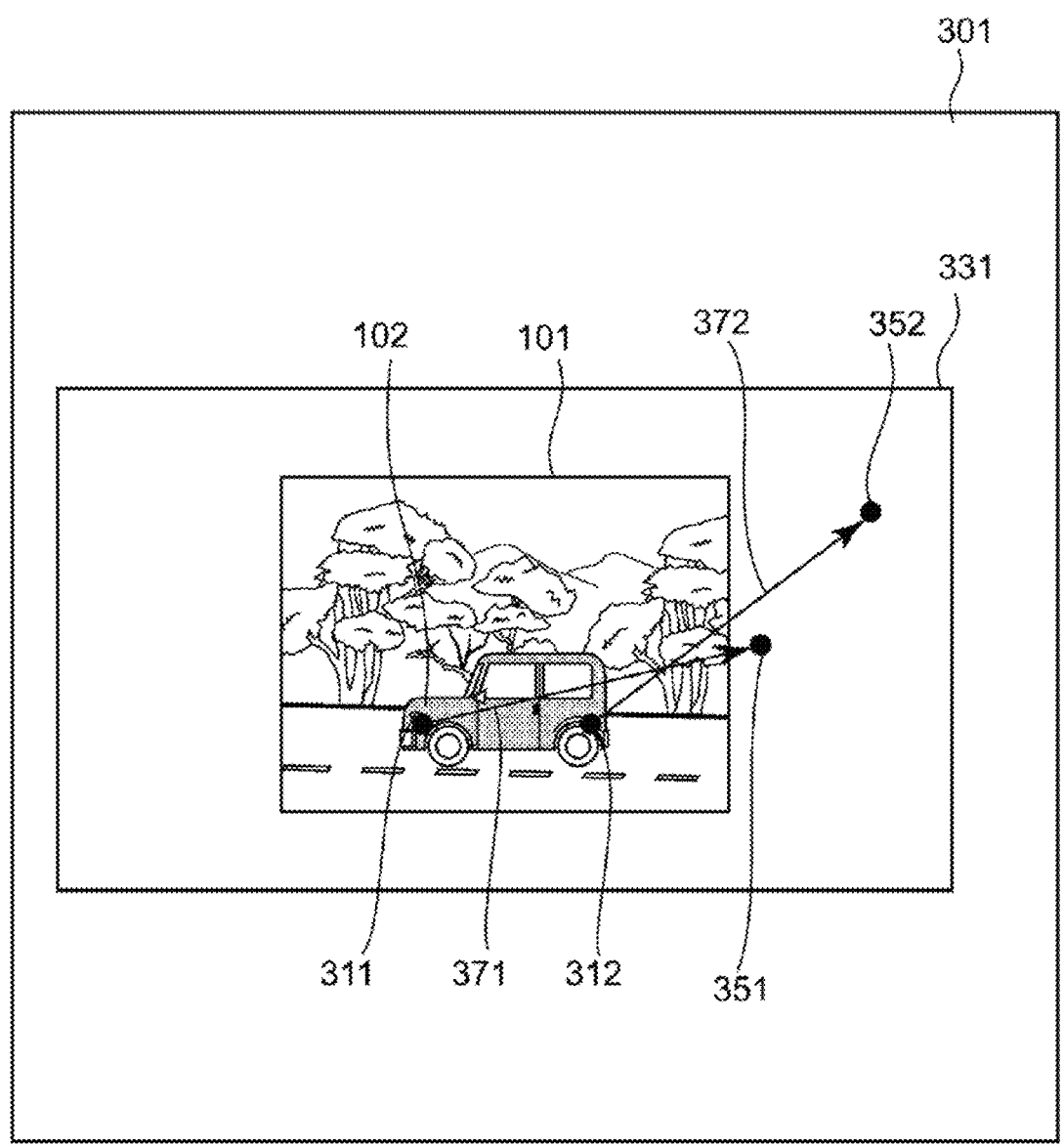
FIG. 4 is an explanatory drawing showing the condition in which a user specifies the correspondence relationship between the reference image and the target image.

FIGS. 3 and 4 are explanatory drawing showing the condition in which a user specifies the correspondence relationship between the reference image and the target image. The explanation below makes reference to these drawings.

In the examples shown by these drawings, a video frame 331 expressing a region where a video including the still image 101 and the frame image 201 should be reproduced within the screen 301 is displayed.

In the example shown in FIG. 3, the still image 101 is enlarged or reduced and positioned so as to occupy the center of the video frame 331, but in the example shown in FIG. 4, the still image 101 is positioned separated from the video frame 331.

This is because in general the aspect ratio differs between the still image 101 and the video frame 331.

Here, the user accomplishes:

(a) a designation by drawing an arrow 371 from a reference position 311 where the front edge of the automobile 102 is depicted in the still image 101 to a target position 351 where the front edge of the automobile 202 should be depicted in the video frame 331; and (b) a designation by drawing an arrow 372 from a reference position 312 where the back edge of the automobile 102 is depicted in the still image 101 to a target position 352 where the back edge of the automobile 202 should be depicted in the video frame 331.

These designations are accomplished for example by a drag-and-drop operation using a mouse or a slide operation on a touch screen or touch panel (an operation of touching the screen with a finger, and then removing the finger after causing the finger to move while still in contact).

With this preferred embodiment, the user selects the locations (front edge and back edge) that are to be marks of the reference object (automobile 102) by designating reference positions 311 and 312 where those locations (front edge and back edge) are depicted in the still image.

Furthermore, the user designates the target positions 351 and 352 where the locations (front edge and back edge) corresponding to the target object (automobile 202) should be depicted in the video frame 331.

In the examples shown in these drawings, the aspect ratio of the video frame 331 is 9:16, and matches in size the video image that is the search target. Accordingly, the target positions 351 and 352 designated by the user in the video frame 331 are used as positions directly expressing the position and orientation where the automobile 202 that is the target object 202 should be appear.

On the other hand, for videos having different aspect ratios or videos with different vertical and horizontal pixels counts, the vertical and horizontal of those videos are made to match by stretching or contracting horizontally and vertically the 9:16 video frame 331. That is to say, as the target position in a video having a different aspect ratio or vertical and horizontal pixel counts, it would be fine to use not the target positions 351 and 352 the user directly designated in the video frame 331 but rather those moved through expansion or contraction as described above.

With this preferred embodiment, it is possible to search for video images by specifying through a simple operation in what position and orientation the target object should appear in a frame image contained in the video. Below, details of the video search art are explained.

(Video Search Device)

Figure 5:
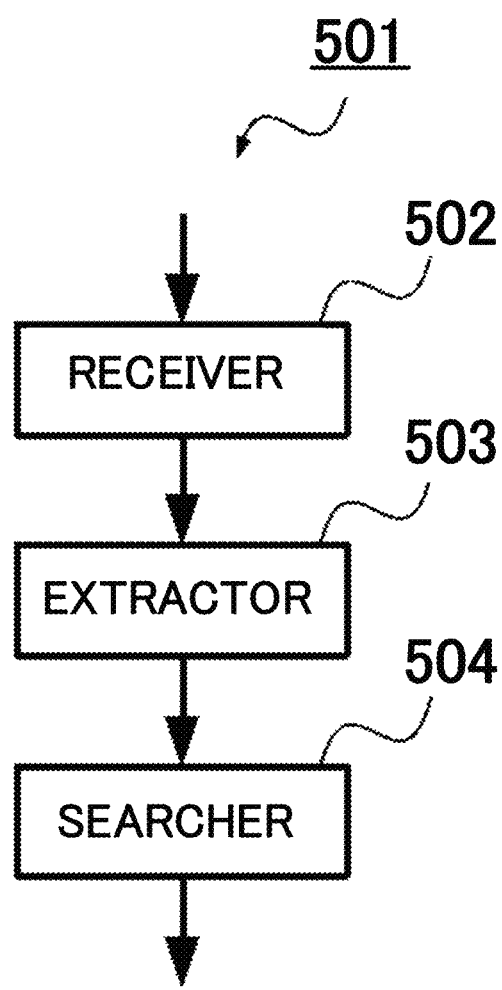
FIG. 5 is an explanatory drawing showing the summary composition of a video search device according to an example of the present invention.
Figure 6:
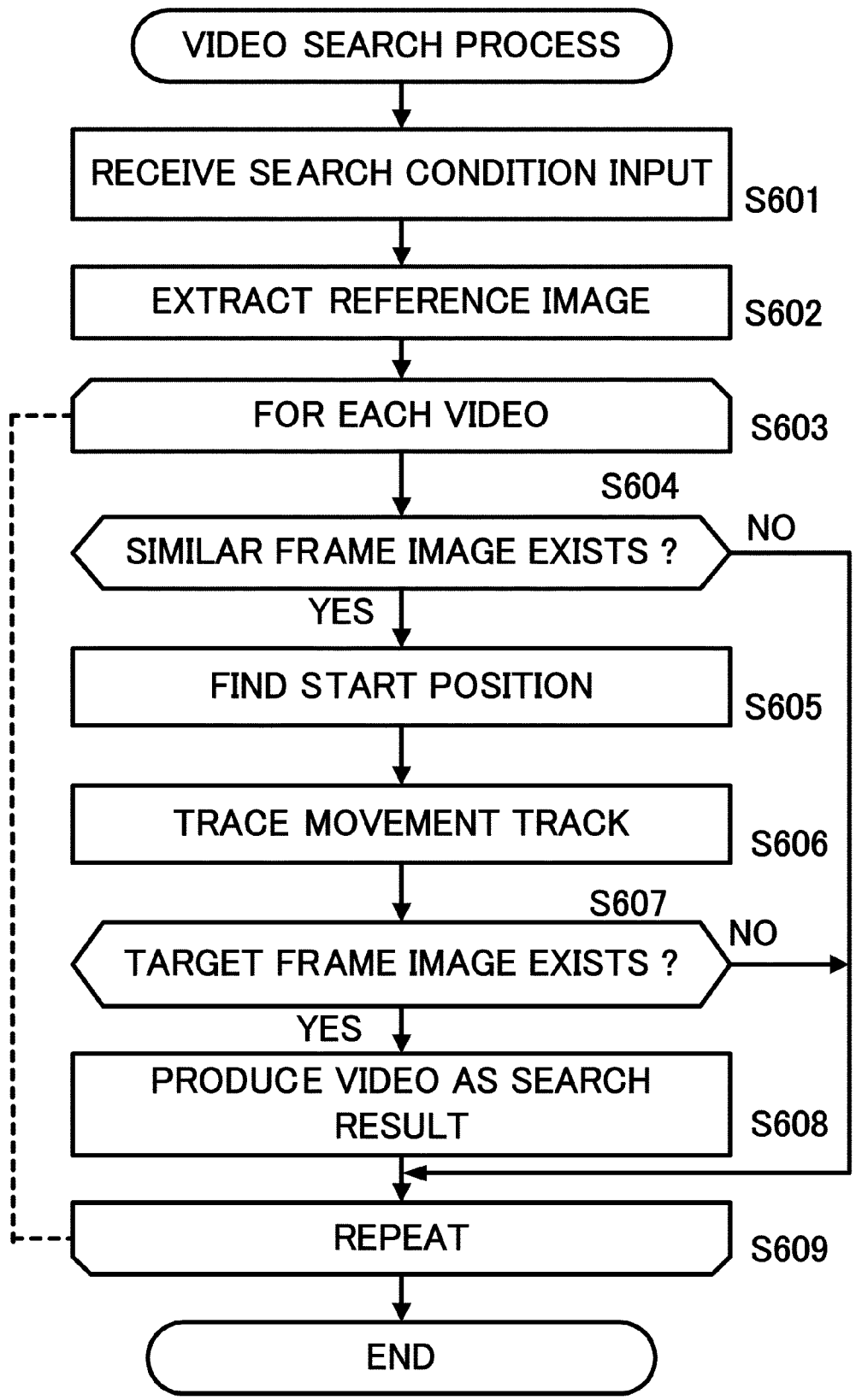
FIG. 6 is a flowchart showing the flow of control of the video search process executed by a video search device according to an example of the present invention.

FIG. 5 is an explanatory drawing showing the summary composition of a video search device according to an example of the present invention. FIG. 6 is flowchart showing the flow of control in a video search process executed by the video search device according to an example embodiment of the present invention.

A video search device 501 according to this preferred embodiment is realized by a prescribed program being executed in a computer, and comprises a receiver 502, an extractor 503 and a searcher 504.

The receiver 502 receives input of the below information as search conditions (step S601).

(a) still image 101.

(b) reference positions 311 and 312 within the still image 101 (in this preferred embodiment, the starting points of arrows 371 and 372).

(c) target positions 351 and 352 within the video frame 331 (in this preferred embodiment, the ending points of arrows 371 and 372).

As described above, the functions of the receiver 502 are realized by the working together of a display or mouse, touch screen or touch panel, under control of the CPU.

Next, the extractor 503 extracts the reference image depicted in the reference region based on the reference positions 311 and 312 (step S602).

As described above, with this preferred embodiment, the user specifies the still image 101 when the reference object is depicted. In addition, the user specifies the reference positions 311 and 312 where the locations the user thinks are the marks of the reference object are depicted, in the still image 101.

The extractor 503 extracts the reference image from the information regarding the still image 101 and the reference positions 311 and 312 by using image processing technology.

Figure 7:
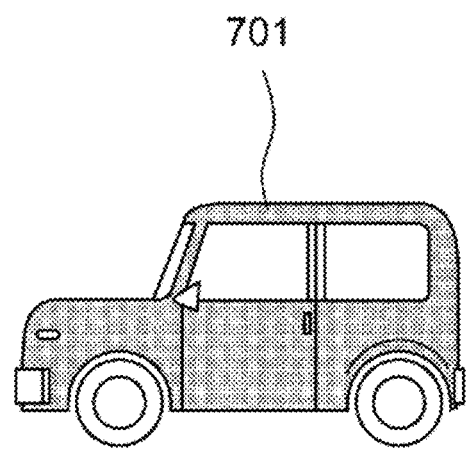
FIG. 7 is an explanatory drawing showing the condition of the reference image obtained by user specification.

FIG. 7 is an explanatory drawing showing the condition of the reference image obtained by the user's specification shown in FIGS. 3 and 4. The explanation below makes reference to this drawing.

As shown in the drawing, a reference image 701 shows the external appearance of the reference object as photographed from a given shooting direction. In this example, the automobile 101 is photographed from the left side, and the background is removed from the photographed image. That is to say, the outer edge of the reference region corresponds to a boundary line dividing the reference object from the background in the still image 101.

In extracting the reference image 701, it is possible to use various types of image recognition technology. For example, after extracting the outline of the still image 101 and accomplishing region separation, regions that include the reference positions 311 and 312 are selected. Furthermore, regions interposed between the selected regions, regions adjacent to the selected regions and regions with small differences in average color and/or the like are bonded, and a reference region is obtained by repeating this. In addition, it would also be fine to use the art disclosed in Patent Literature 1.

The reference image 701 is the reference image including the reference positions 311 and 312 cut away from the still image 101, so the reference positions 311 and 312 are both contained within the reference region and are position locations that are marks of the reference object in the reference image 701.

The extractor 503 is realized by the CPU working together with RAM and/or the like where pixel information of the still image 101 is recorded.

Furthermore, the searcher 504 repeats the below process for each of multiple videos (step S603).

First, a frame image that is a frame image in which the video is included and in which a local image similar to the reference image 701 is depicted (hereafter called a 'similar frame image") is searched for, and a determination is made as to whether or not a similar frame image is contained in the video (step S604).

The video is composed of a string of multiple frame images in chronological order. In the video frame 331 prepared in the frame 301, it is possible to playback the video by displaying the frame videos in order at a prescribed time interval (for example, one-thirtieth of a second or one-sixtieth of a second are common). That is to say, a frame image can be thought of as a type of still image.

With this preferred embodiment, the multiple videos are recorded in advance in a video database and/or the like. Multiple frame images are included for each video. Here, a determination is made as to whether or not a local image resembling the reference image 701 is depicted in each frame image by applying various types of image similarity determination technology and image recognition technology.

Figure 8:
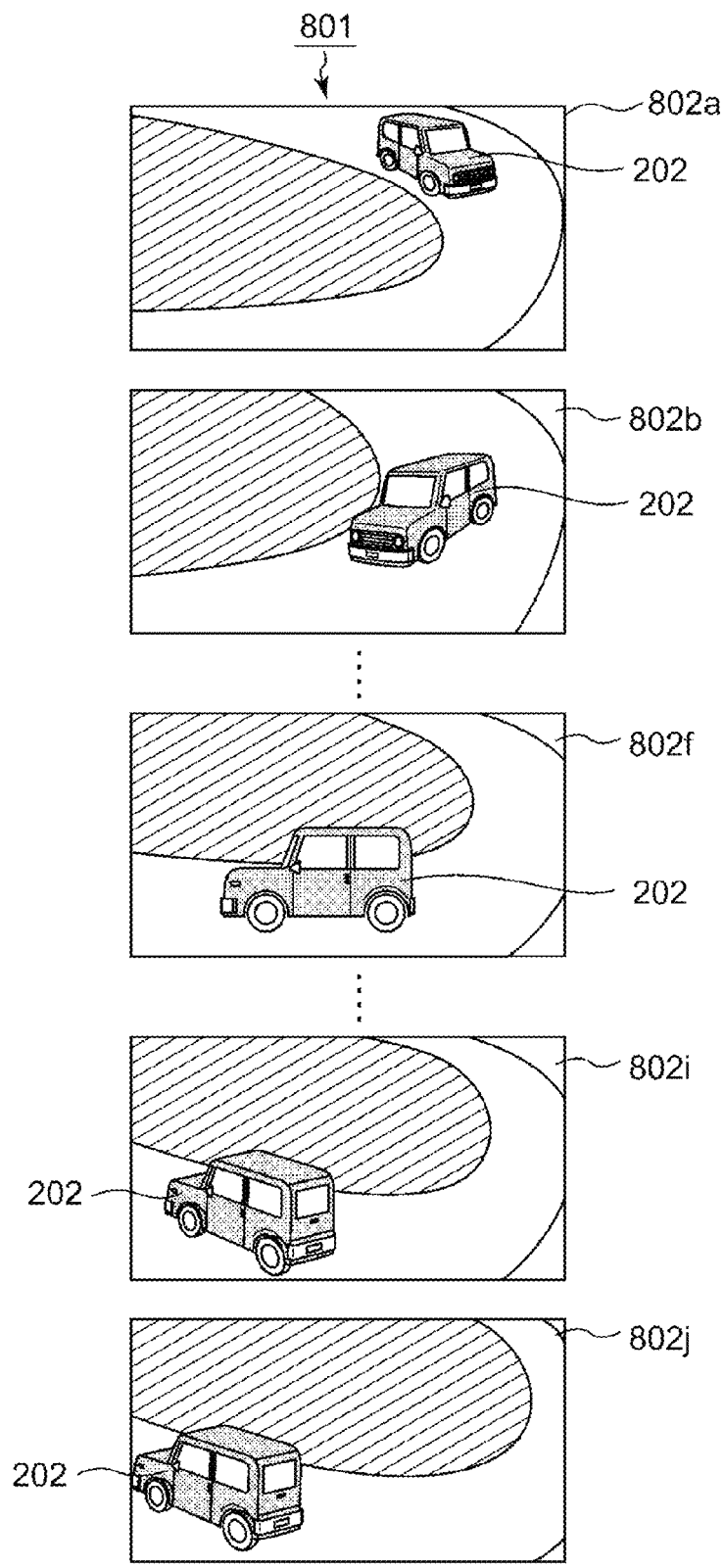
FIG. 8 is an explanatory drawing showing an example of a video containing a frame image having a local image similar to the reference image.

FIG. 8 is an explanatory drawing showing an example of a video containing frame images having a local image resembling the reference image 701. The explanation below makes reference to this drawing.

As shown in the drawings, a video 801 comprises a string of multiple frame images 802a, 802b, . . . , 802f, . . . 802i, 802j, . . . (in this drawing, the time interval of the frame images is lengthened in order to facilitate understanding. That is to say, the frame images are shown curtailed from typical videos). In the explanation below, when these multiple frame images are referred to in general terms, the reference will be to "frame images 802", omitting the letter at the end of the reference number.

In the frame images 802, the automobile 202 resembling the automobile 102 that is the reference object is depicted.

However, in the frame images 802a, 802b, 802i and 802j, the shooting direction differs, so in the frame images 802a, 802b, 802i and 802j, an image resembling the reference image 701 is not depicted.

On the other hand, in the frame image 802f, the automobile 202 with virtually the same shooting direction is depicted, and this corresponds to a local image. 803. That is to say, the local image 803 and the reference image 701 have mutually corresponding characteristic points, and the local image 803 and the reference image 701 can be made to overlap by undertaking a transformation such as enlarging or reducing, parallel shifting, rotating or reversing the reference image 701.

In order to detect an image resembling the reference image from within the frame image 802, various types of image recognition, image detection and pattern recognition technology are applied.

For example, in each of the frame images 802 included in the various videos, local characteristic amounts such as SIFT, HOG and/or the like are calculated in advance and stored in a database. Furthermore, the local characteristic amounts are calculated for the reference image 701 and the database is searched for a frame image 802 having a local characteristic amount similar to this local characteristic amount.

When the local characteristic amount of the frame image included in a given video is registered in the database, if the local characteristic amounts of mutually adjacent frame images 802 are similar, it is possible to control data volumes and speed searching by registering such with an appropriate thinning.

In this manner, if a similar frame image in which a local image 803 similar to the reference image 701 is depicted (in the example shown in the drawings, the frame image 802f corresponds to the similar frame image) (step S604; Yes), the searcher 504 determines where in the local image 803 the reference positions 311 and 312 are positioned when the reference image 701 overlaps the local image 803 (below, this position is called the "start position"). That is to say, the searcher 504 finds the start position corresponding to the reference positions 311 and 312 in the reference region, in the local region in which the local image 803 is depicted in the searched similar frame image 802f (step S605).

Figure 9:
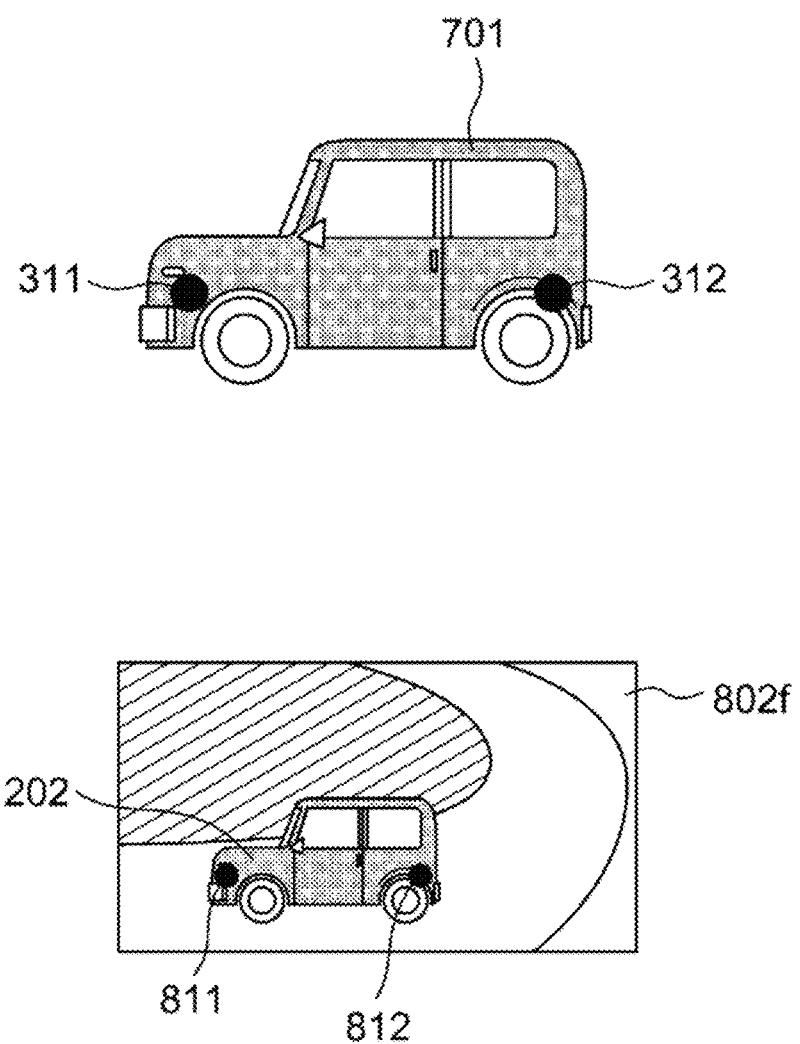
FIG. 9 is an explanatory drawing showing the correspondence relationship between the reference image and the similar frame image.

FIG. 9 is an explanatory drawing showing the correspondence relationship between the reference image 701 and the similar frame image 802f. The explanation below makes reference to this drawing.

In this drawing, black dots are displayed as the marks of the reference positions 311 and 312 at the front edge and back edge of the automobile 102 in the reference image 701.

On the other hand, black marks are displayed as the marks of the start positions 811 and 812 at the front edge and back edge of the automobile 202 inside the automobile 202 corresponding to the local image 803 of the similar frame image 802f.

The reference positions 311 and 312 are positions where positions selected as marks by the user on he reference object (automobile 102) are depicted in the reference image 701

On the other hand, the locations corresponding to marks in the reference object (automobile 102) are depicted as the start positions 811 and 812 on the local image 803 in the target object (automobile 202 similar to automobile 102).

When detecting the local image 803 similar to the reference image 701, transformations such as enlarging or reducing, rotating, reversing and/or the like are done so that the reference image 701 overlaps the local image 803, and by similarly implementing these transformations on the reference positions 311 and 312, the start positions 811 and 812 are obtained.

Following this, the searcher 504 traces how the pixels positioned at the start positions 811 and 812 in the similar frame image 802f (hereafter called "noteworthy pixels") move in the video 801 and obtains the movement track thereof. That is to say, by scanning the frame images 802a, 802b, . . . , 802i, 802j, . . . , contained in the video 801 containing the searched similar frame image 802f in the chronological progress direction (the order of frame images 802g, 802h, 802i, 802j, . . . ) or retrogression direction (the order of frame images 802e, 802d, 802c, 802b, . . . ) from the similar frame image, the searcher 504 traces the movement track along which the noteworthy pixels depicted at the start positions 811 and 812 in the searched similar frame image 802f move through being depicted in other frame images 802 (step S606).

Figure 10:
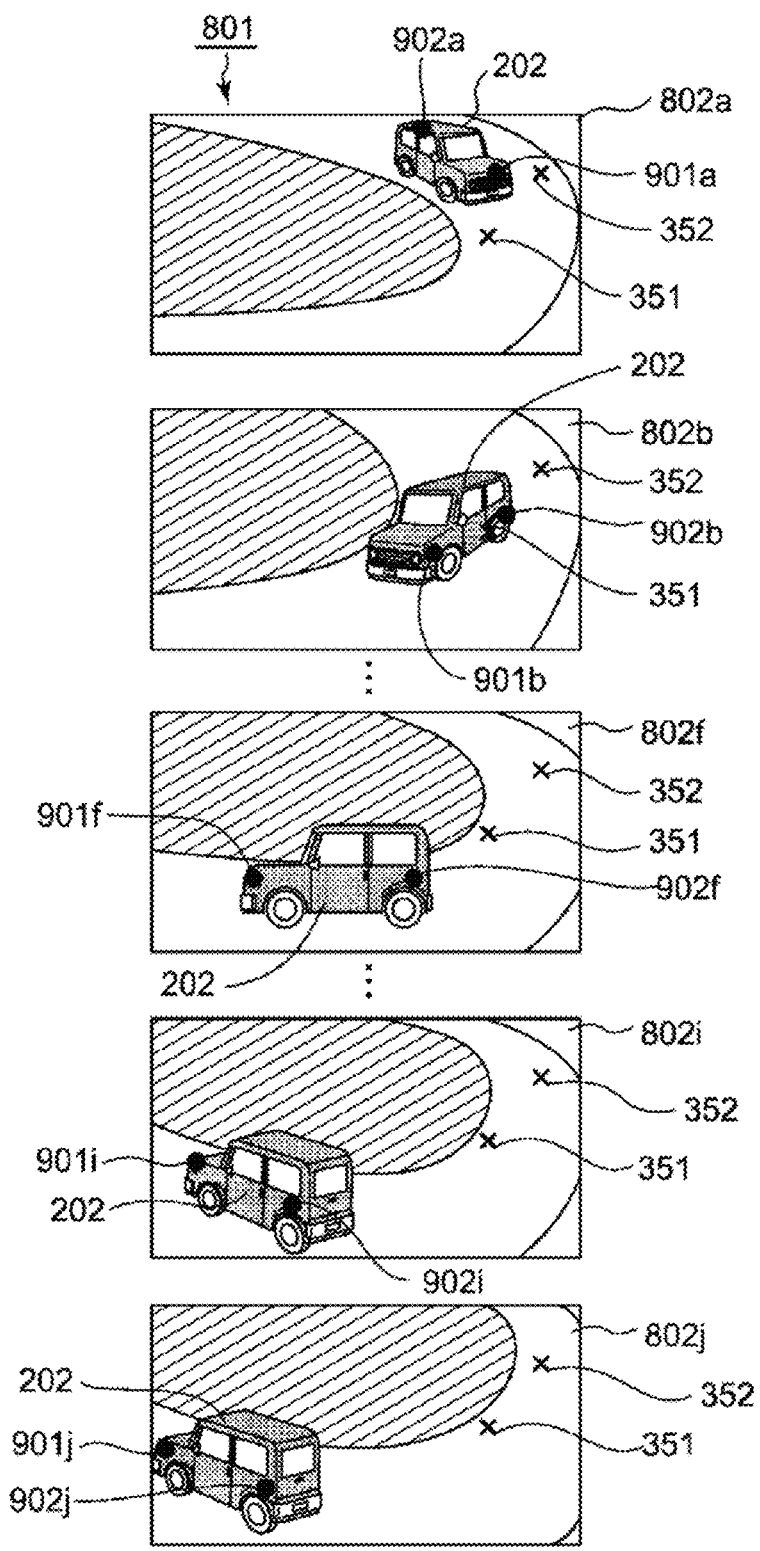
FIG. 10 is an explanatory drawing showing the condition of movement of pixels in the video.

FIG. 10 is an explanatory drawing showing the condition of movement of pixels in the video 801. The explanation below makes reference to this drawing.

As shown in this drawing, noteworthy pixels 901 and 902 are depicted at the start positions 811 and 812 of the similar frame image 802*f*, but these respectively depict the front edge and back edge of the automobile 202.

In this drawing, the positions of the noteworthy pixels 901 and 902 depicting the front edge and back edge of the automobile 202 are shown in the frame images 802*a*, 802*b*, . . . , 802*f*, . . . , 802*i*, 802*j*, . . . , contained in the video 801. In each frame image 802*a*, 802*b*, . . . , 802*f*, . . . , 802*i*, 802*j*, . . . , an English letter corresponding to that frame image 802 is appended at the end of the reference numbers of the noteworthy pixels 901 and 902.

In addition, in this drawing, target positions 351 and 352 referenced in later processes are displayed. The target positions 351 and 352 are designated from the user in the video frame 331, and the target positions 351 and 352 are obtained in each frame image 802 by enlarging/reducing and/or the like so that each frame image 802 fits neatly inside the video frame 331.

It is possible to obtain this kind of trace of the noteworthy pixels 901 and 902 by finding the correspondence relationship among characteristic points in adjacent frame images 802 using art such as SIFT, HOG and/or the like and then interpolating changes in positions of corresponding characteristic points, and through this calculating how the positions of the noteworthy pixels 901 and 902 in one frame image 802 move in the other frame image 802. In addition, a trace of the noteworthy pixels 901 and 902 is possible even by applying Particle Video art.

The trace of the noteworthy pixels 901 and 902 does not necessarily mean tracing the track along which pixels of the same color move. That is to say, this means tracing where the location of the target object depicted in the frame images 802 by the noteworthy pixels 901 and 902 is depicted in another frame image 802. Accordingly, depending on the target object photography status and/or the like, the color of the noteworthy pixels 901 and 902 may gradually change.

In this manner, the frame images 802 are scanned in the chronological progress direction or retrogression direction from the similar frame image 802 contained in the video 801, and where the noteworthy pixels 901 and 902 are positioned in each frame image 802 is traced. Accordingly, movement tracks of the noteworthy pixels 901 and 902 are obtained.

Figure 11:
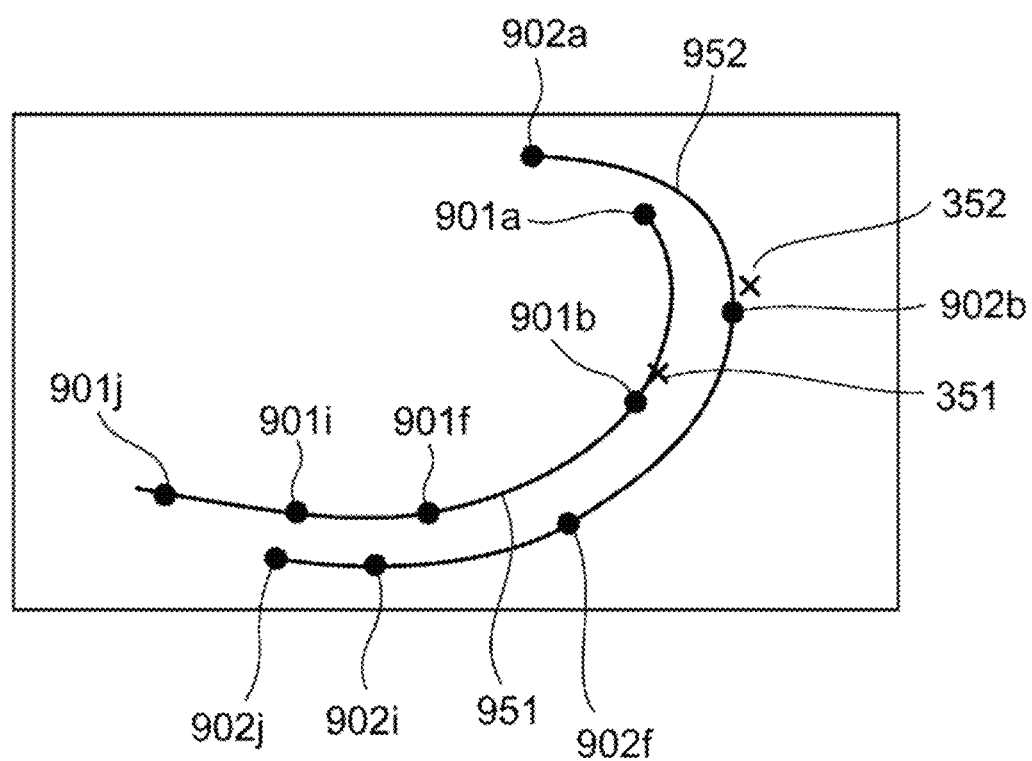
FIG. 11 is an explanatory drawing showing the track of movement of pixels in the video.

FIG. 11 is an explanatory drawing showing movement tracks of the noteworthy pixels 901 and 902 in the video 801. The explanation below makes reference to this drawing.

As shown in this drawing, in the video 801 the noteworthy pixels 901 and 902 depict movement tracks 951 and 952 moving smoothly from the upper right of the screen (frame image 802*a*) to the lower left of the screen (from frame image 802*j* on) with the passage of time. The movement tracks 951 and 952 pass through the start positions 811 and 812, respectively, in the similar frame image 802*f*.

The searcher 504 traces these movement tracks 951 and 952 with the passing of time, searches frame images (hereafter called "target frame images") where these simultaneously arrive close to the target positions 351 and 352, and determine whether or not the video 801 contains the target frame image (step S607).

Returning to FIG. 10, when the positions of the noteworthy pixels 901 and 902 in each frame image 802 are compared to the target positions 351 and 352, it is understood in frame image 802*b* that these are positioned close. Accordingly, in this example, the frame image 802*b* is found as the target frame image as a search result.

In this manner, if a target frame image is found (step S607; Yes), this video 801 is output as a search result (step S608).

Furthermore, for all videos 801 recorded in the database, the process from step S603 on is repeated (step S609) and this process concludes when the process has been executed for all.

It would be fine to display the output as search results in step S608 by immediately outputting such to the screen of a display and/or the like so that search results are additionally displayed on successive screens each time a desired video is discovered. Besides this, it would be fine in step S608 to accumulate search results by outputting such temporarily to a RAM and/or the like, and after repetition of steps S603 through S609 is completed, to display all at once on the screen of a display and/or the like.

On the other hand, when no similar frame images are discovered (step S604; No), or when no target frame images are discovered (step S607: No), the process advances to step S609. Accordingly, this video 801 does not become a search result.

In this manner, in this preferred embodiment even when the composition in which the reference object is depicted in the still image 101 and the composition in which the target object appears in the video 801 are completely different, it is possible for a user to easily accomplish searching of videos by simply inputting the correspondence relationship between the reference positions 311 and 312 that are marks in the still image 101 and the target positions 351 and 352 in these video frames 331.

In particular, in this preferred embodiment it is possible to easily and quickly accomplish video searches because searches are executed through a two-dimensional image process.

Embodiment 2

At present, it is possible to determine whether or not a local image 803 is similar to a reference image 701 even when rotated by around 30 degrees, using image recognition technology such as SIFT and/or the like. However, when the angle of rotation exceeds this, or when the images are reversed and have a mirror-image relationship, detection is impossible.

In such a case, it would be good if besides local characteristic amounts of the reference image 701, a mirror image of this reference image 701 reversed were prepared and the local characteristic amounts of this mirror image were also found, and for frame images 802 having local characteristic amounts similar to either of these two local characteristic amounts to be searched from the database.

In searching for similar frame images, it would be fine to constantly use both the reference image 701 and the mirror image thereof, but it is also possible to selectively use one of the reference image 701 and the mirror image.

For example, it is possible to use the relative position relationship of the reference positions 311 and 312 and the relative position relationship of the target positions 351 and 352.

Figure 12:
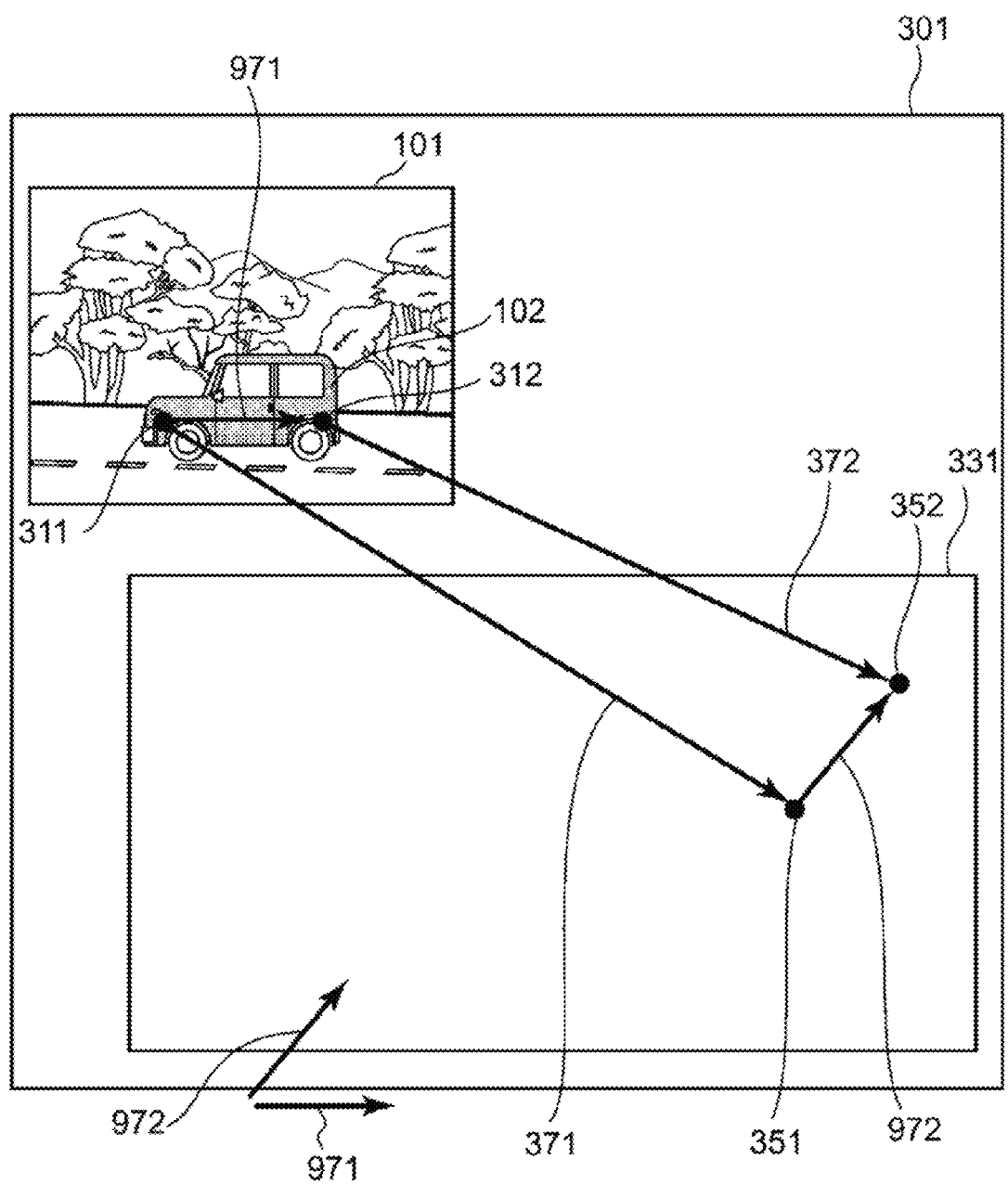
FIG. 12 is an explanatory drawing showing an explanation of the relative position relationship of the reference positions and the relative position relationship of the target position.
Figure 13:
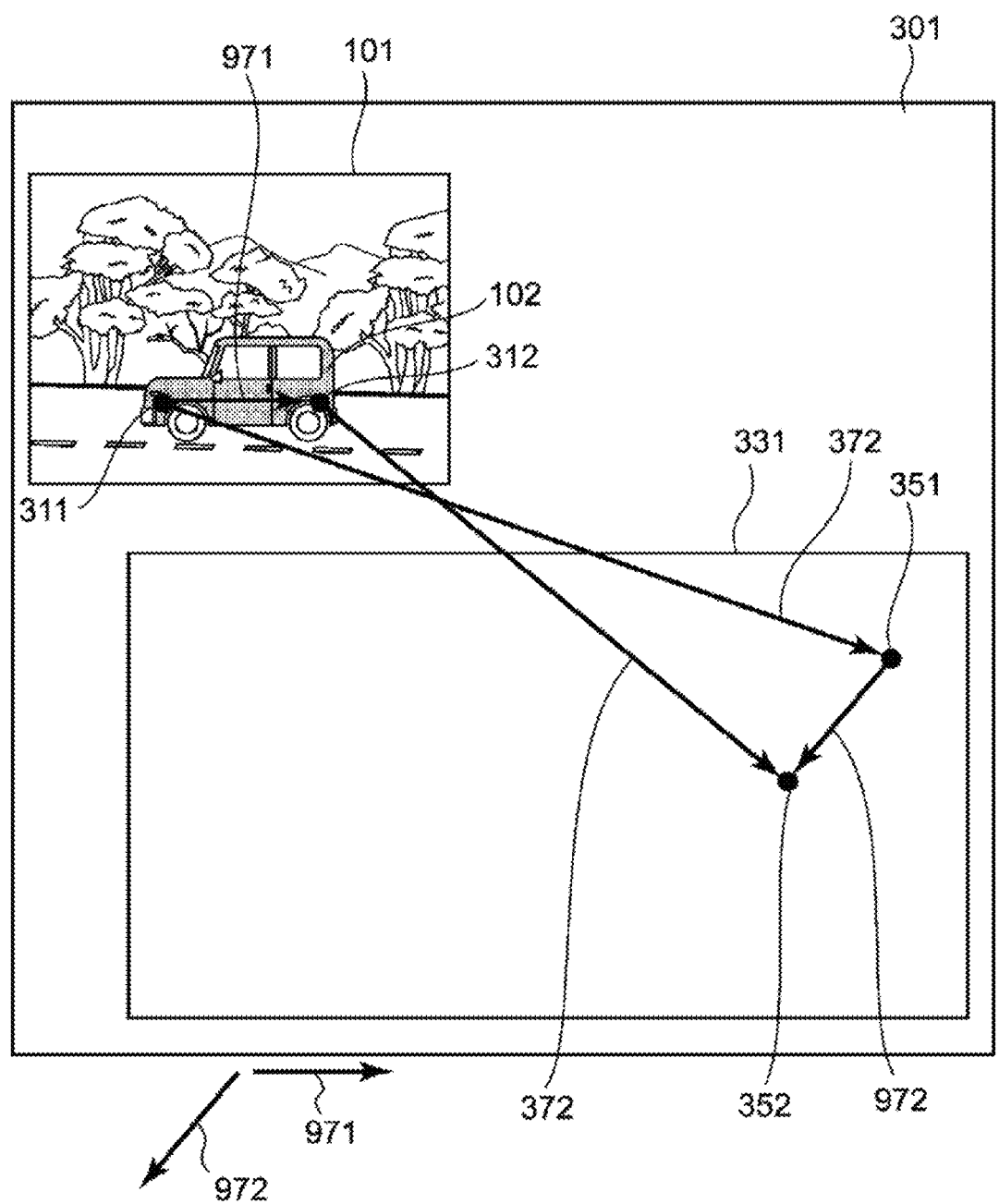
FIG. 13 is an explanatory drawing showing an explanation of the relative position relationship of the reference positions and the relative position relationship of the target positions.

FIGS. 12 and 13 are explanatory drawing explaining the relative position relationship of the reference positions 311 and 312 and the relative position relationship of the target positions 351 and 352. The explanation below makes reference to these drawings.

A direction vector 971 going from the reference position 311 to the reference position 312 and a direction vector 972 going from the target position 351 to the target position 352 are shown in these drawings.

The example shown in FIG. 12 makes reference to the example shown in FIG. 3 (and FIG. 4), and the direction vectors 971 and 972 form an acute angle. In this kind of case, the reference image 701 is used in searching for similar frame images.

On the other hand, in the example shown in FIG. 13, the target positions 351 and 352 are designated so as to switch the front edge and the back edge of the reference positions 311 and 312 of the automobile 102 seeing from the left side in the still image 101, so as to search for a video in which an automobile 202 seeing from the right side and slightly upward appears.

Accordingly, the direction vectors 971 and 972 form an obtuse angle. In this kind of case, a mirror image is used in searching for a similar frame image.

Besides this, there is also a method of determining the angle that is the appropriate boundary, for example using the reference image 701 if the angle formed by the direction vectors 971 and 972 is 60 degrees or less, using the mirror image if the angle formed by the direction vectors 971 and 972 is at least 120 degrees, and using both the reference image 701 and the mirror image if the angle formed by the direction vectors 971 and 972 is greater than 60 degrees but less than 120 degrees.

These methods are based on heuristics such as thinking that reversal in the horizontal direction is more typical than reversal in the vertical direction when shooting video and in addition that this is what the user wants to search, and with these it is possible to increase the speed of video searches.

Embodiment 3

With the information obtained from the above-described examples, when the searched video 801 is reproduced, it is possible to find the track (hereafter called the "representative track") over which the target object 202 itself moves.

For example, in each frame image 802, the region where the target object 202 is depicted is found and the pixel at the center point (centroid of the region) thereof is called a representative pixel. By tracing this representative pixel, it is possible to create the representative track over which the target object 202 moves in the video 801.

In addition, as a method with simpler computations, there is a method that takes as the representative pixel the pixel at the position of the midpoint of the noteworthy pixels 901 and 902 in each frame image 802.

Figure 14A:
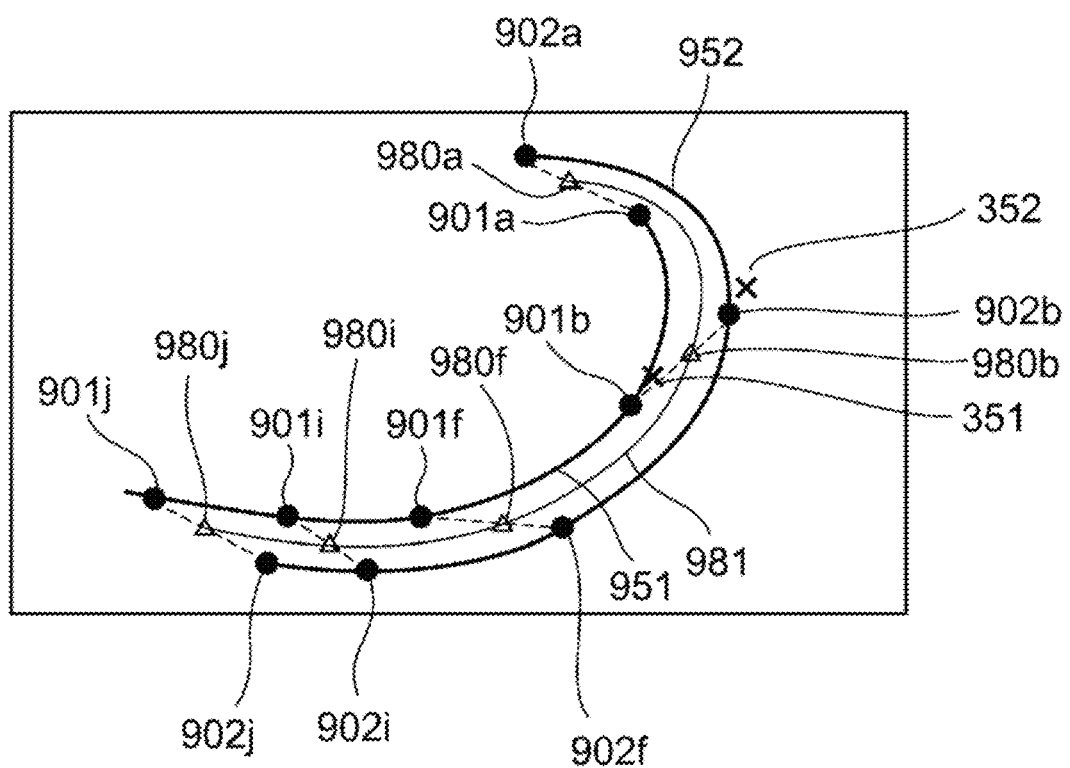
FIG. 14A is an explanatory drawing showing the condition of a representative track.

FIG. 14A is an explanatory drawing showing the state of the representative track for the example shown in FIG. 11. The explanation below makes references to this drawing.

As shown in this drawing, a representative track 981 passes through the midpoint 908 of the noteworthy pixels 901 and 902 in each of the frame images 802. Accordingly, the representative track 981 is an average of the movement tracks 951 and 952 of movement of the noteworthy pixels 901 and 902.

In the video search device 501 according to this preferred embodiment, a video 801 in which the target object 202 similar to the reference object 102 appears at a position and attitude desired by the user is searched, from the user.

Hence, in this preferred embodiment, the representative track 981 is output as a search result along with the searched video 801.

Figure 14B:
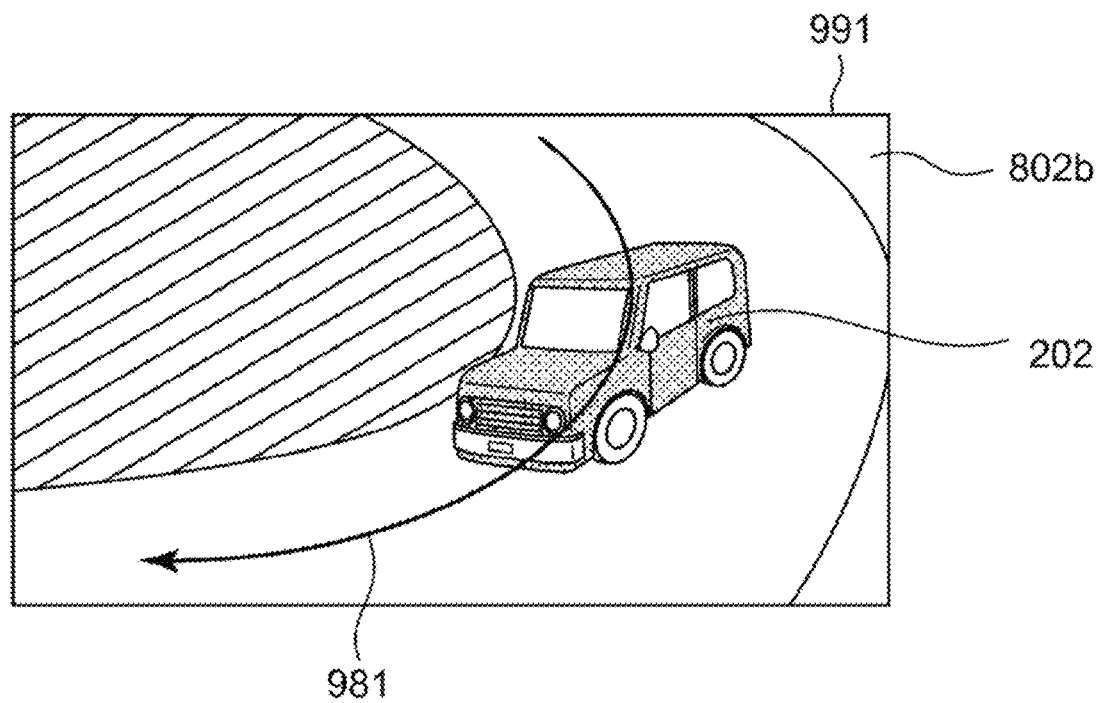
FIG. 14B is an explanatory drawing showing the condition of a summary image.

FIG. 14B is an explanatory drawing showing the condition of a summary image for explaining a summary of a video 801 when the video 801 and the representative track 981 are output as search results. The explanation below makes reference to this drawing.

As shown in this drawing, a summary image 991 depicts the frame image 802b where the target object 202 similar to the reference object 102, out of the video 801 that is the search result, appears in the position and attitude desired by the user, with the representative track 981 overlaid in the shape of an arrow.

It is possible for the summary image 991 to use thumbnail images and/or the like when showing a summary display of the search result video, and it is possible to provide more detailed information relating to the obtained video 801 to the user by showing the representative track 981 as a search result.

Embodiment 4

In the above-described examples, the representative track 981 where the target object 202 moves is output as search results, but in this preferred embodiment, the user is caused to input the track where the target object 202 should move (hereafter called the "target track") and videos in which the representative track 981 is similar to the target track become search results.

That is to say, in this preferred embodiment, the receiver 502 in addition to the above-described information also receives the input of a target track in the frame images contained in the video.

Figure 15:
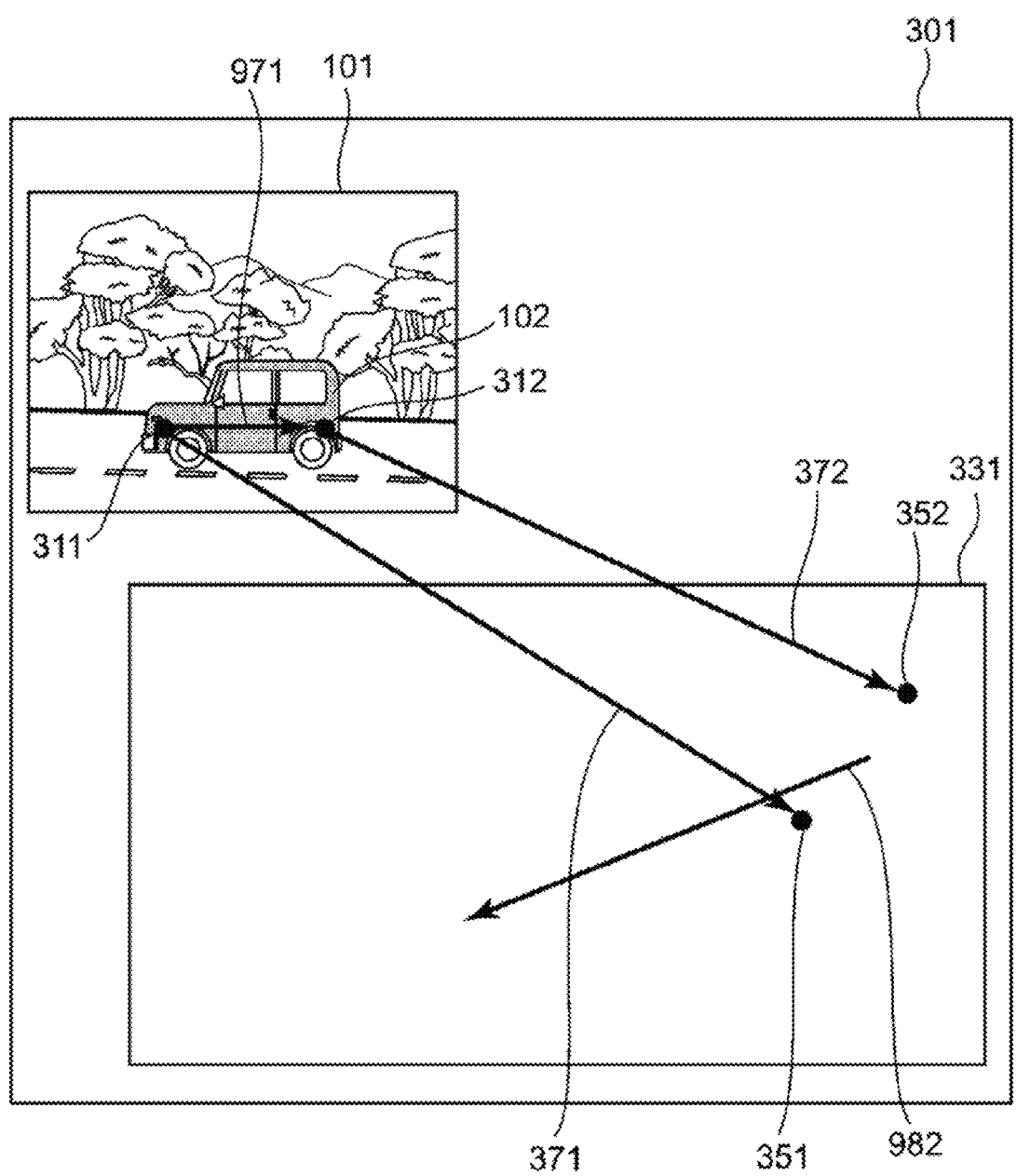
FIG. 15 is an explanatory drawing showing the condition when a user specifies a target track.

FIG. 15 is an explanatory drawing showing the condition when the user has further designated the target track in the input example shown in FIG. 3. The explanation below makes reference to this drawing.

As shown in this drawing, the user inputs an arrow 982 starting near the target positions 351 and 352 in the video frame 331, in addition to the arrows 371 and 372. This arrow 982 is the target track input by the user.

In this preferred embodiment, the following process is executed after the target frame image 802b is discovered in the video 801 (step S607; Yes).

Figure 16:
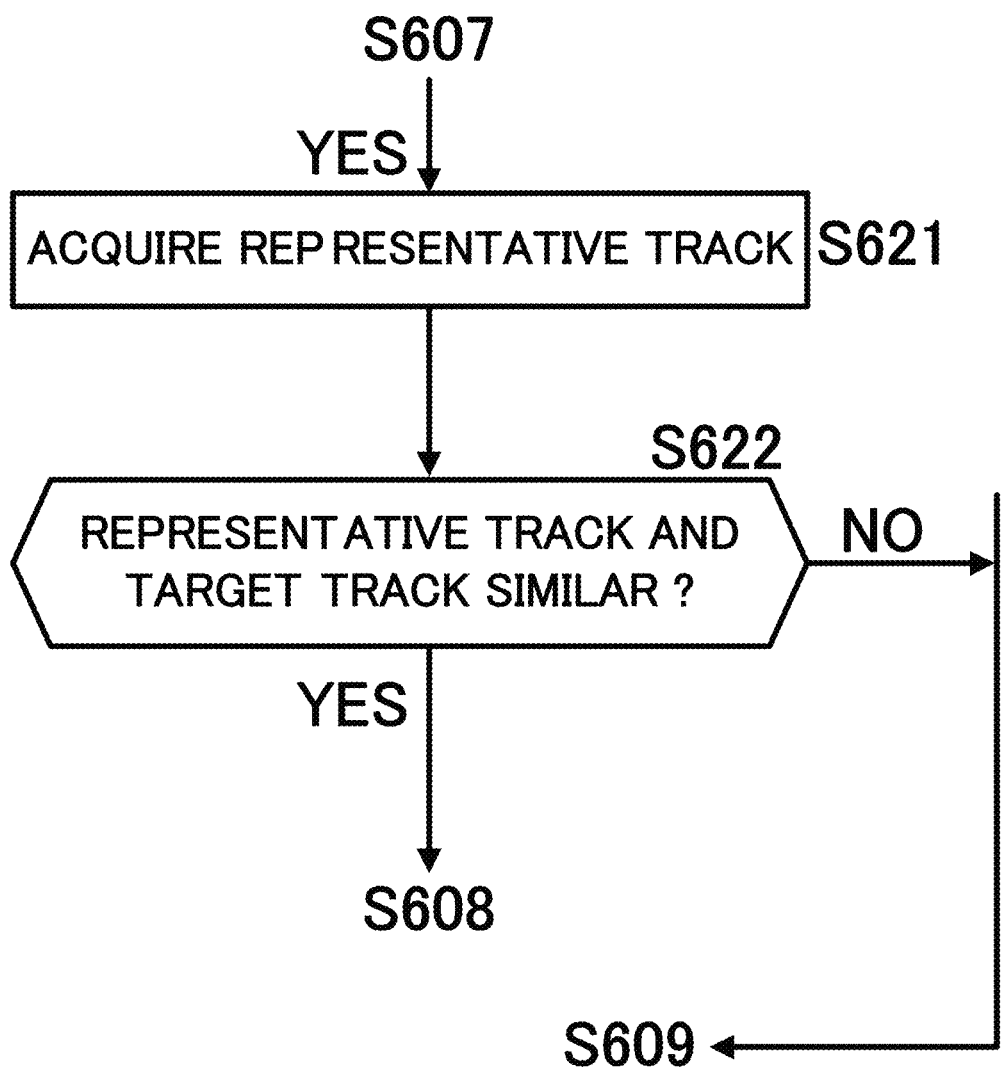
FIG. 16 is a flowchart showing the contents of a process followed in the video search process.

FIG. 16 is a partial flowchart showing the content of a process added to the video search process in the flowchart shown in FIG. 6. The explanation below makes reference to this drawing.

As shown in this drawing, when the target frame image 802b is discovered (step S607; Yes), the searcher 504 traces the frame images 802 in chronological order from the target frame image 802b to obtain the representative track 981 (step S621).

Furthermore, a determination is made as to whether or not the representative track 981 obtained and the target track designated by the arrow 982 by the user are similar (step S622).

Here, the simplest method of determining similarity between the representative track 981 and the target track is as follows. That is to say, the determination is that the two are similar when the difference in angles formed by the orientation from the starting point to the ending point of the representative track 981 and the orientation from the starting point to the ending point of the target track is not greater than a prescribed threshold value, and that the two are not similar if this prescribed threshold value is exceeded. Besides this, it is also possible to apply various curve similarity determination technologies.

When the representative track 981 and the target track are similar (step S622; Yes), the process advances to step S608 and that video is output as a search result.

On the other hand, when the representative track 981 and the target track are not similar (step S622; No), the process advances to step S609 and the process is repeated with another video as the process subject.

With this invention, it is possible for the user to easily designate in what position the target object is, in what orientation such is positioned and in what direction such is moving from there within the video frame 331, so it is possible to easily and swiftly execute a video search.

In the above-described example, a video obtained by shooting in the real world using a camera was cited as an example of the video 801, but it is also possible to apply the same method to an arbitrary video, such as a video created through computer graphics of the condition of a virtual world viewed from a virtual point of view, or an animated video obtained by creating and arranging frame images one at a time through manual work, and/or the like.

Embodiment 5

In the above-described preferred embodiments, the reference positions 311 and 312 and the target positions 351 and 352 were designated by inputting the arrows 371 and 372, but it is also possible to use other parameters when the user draws the arrows 371 and 372.

For example, when a touch panel, mouse, controller and/or the like is used that is capable of detecting the strength of the user's pressure, it is possible to change the size of the neighborhood of the target positions 351 and 352 in accordance with the user's pressing strength when drawing the arrows 371 and 372.

In this state, the display settings of the screen 301 are set so that if the user's pressing force is strong in the input example shown in FIGS. 3 and 4, the arrows 371 and 372 are drawn boldly, while if the user's pressing force is weak, the arrows 371 and 372 are drawn thinly.

Furthermore, through the strength of the user's pressing force, that is to say the thickness of the arrows 371 and 372, the size of a threshold value concerning whether or not a position is in the neighborhood of the target position is determined.

With this preferred embodiment, it is possible for detailed specification of search conditions for a video to be realized through simple operations.

Besides this, as shown in FIG. 3, when the video frame 331 is displayed in a position different form the still image 101, it is possible to exhibit various information within the video frame 331.

There is also a method of totaling the local information amounts for the frame images 802 of all videos 801 recorded in the database for each position within the video frame 331, and making a screen display within the video frame 331 of the distribution of each position of the totaled results.

In general, when the local information amount is a scalar value, the greater that value the easier that location is to see for a person and the more this can be forecasted as a characteristic location.

In addition, when the local information amount is a vector value, the longer the length thereof, the more this location can be forecast to be characteristic.

Accordingly, by making the sum of the local information amounts scalar, it is possible to obtain the degree to which each position within the video frame 331 is characteristic in the average of all videos.

Accordingly, with this method, the user more easily forecasts with what position as the target position a more appropriate search result can be obtained, and/or the like.

This application claims the benefit of Japanese Patent Application No. 2012-010492, filed on 20 Jan., 2012, the entire disclosure of which is incorporated by reference herein.

INDUSTRIAL APPLICABILITY

With the present invention, it is possible to provide a video search device, video search method, recording medium and program for accomplishing video searches such that a user can easily specify an object that should appear in the video, and the position, orientation and moreover movement thereof.

REFERENCE SIGNS LIST

101 Still image
102 Reference object automobile
121 Entire region of still image
122 Reference region
123 Reference image
201 Frame image
202 Target object automobile
221 Entire region of frame image
222 Target region
223 Target image
301 Screen
311 Reference position
312 Reference position
331 Video frame
351 Target position
352 Target position
371 Arrow
372 Arrow
501 Video search device
502 Receiver
503 Extractor
504 Searcher
701 Reference image
801 Video
802 Frame image
803 Local image
811 Start position
812 Start position
901 Noteworthy pixel
902 Noteworthy pixel
951 Movement track
952 Movement track
971 Direction vector related to reference position
972 Direction vector related to target position
981 Representative track
982 Arrow related to target track
991 Summary image

The invention claimed is:

1. A video search device, comprising:
   a receiver for receiving input of a still image in which a reference object is depicted, a first reference position and a second reference position contained in a reference region in which the reference object in the still image is depicted, and a first target position and a second target position within a frame image contained in a video;
   an extractor for extracting a reference image depicted in the reference region based on the first reference position and the second reference position; and
   a searcher for searching for, similar frame images that are frame images contained in the videos and in which local images similar to the reference image are depicted, finding a first start position and a second start position corresponding to the first reference position and the second reference position in the reference region, in a local region in which the local image is depicted in the searched similar frame image, tracing a first movement track along which a first noteworthy pixel depicted at the first start position moves in the searched similar frame image and a second movement track along which a second noteworthy pixel depicted at the second start position moves, by scanning frame images contained in the video including the searched similar frame image in the chronological progress or retrogression direction from the searched similar frame image, searching a target frame image at which the first movement track reaches the neighborhood of the first target position and the second movement track reaches the neighborhood of the second target position, and producing as a search result a video including the searched similar frame image and the searched target frame image.

2. The video search device according to claim 1, wherein:
the receiver further receives input of a target track in a frame image including the video; and
the searcher, for each of the searched videos, traces a representative track along which a representative pixel of a local image depicted in the searched target frame image moves, by scanning frame images contained in the searched video in the chronological direction from a target frame image included in the video, and produces as the search result a video in which the target track and the representative track are similar.

3. The video search device according to claim 1, wherein the searcher, for each of the searched videos, traces a representative track along which a representative pixel of a local image depicted in the searched target frame image moves, by scanning frame images contained in the searched video in the chronological direction from a target frame image included in the video, and produces as the search result the representative track of those videos along with those videos.

4. The video search device according to claim 1, wherein:
the extractor obtains image characteristic amounts for the reference image; and
the searcher searches for the similar frame images by searching for frame images having image characteristic amounts similar to the image characteristic amounts of the reference image.

5. The video search device according to claim 4, wherein:
the extractor further obtains image characteristic amounts of a mirror image that is a reversal of the reference image; and
the searcher searches for the similar frame images by searching for frame images similar to the image characteristic amounts of the reference image or the image characteristic amounts of the mirror image.

6. A video search method executed in the video search device including a receiver, an extractor and a searcher comprising the steps of:
receiving input of a still image in which a reference object is depicted, a first reference position and a second reference position contained in a reference region in which the reference object in the still image is depicted, and a first target position and a second target position within a frame image contained in a video;
extracting a reference image depicted in the reference region based on the first reference position and the second reference position; and
searching for, similar frame images that are frame images contained in the videos and in which local images similar to the reference image are depicted, finding a first start position and a second start position corresponding to the first reference position and the second reference position in the reference region, in a local region in which the local image is depicted in the searched similar frame image, tracing a first movement track along which a first noteworthy pixel depicted at the first start position moves in the searched similar frame image and a second movement track along which a second noteworthy pixel depicted at the second start position moves, by scanning frame images contained in the video including the searched similar frame image in the chronological progress or retrogression direction from the searched similar frame image, searching a target frame image at which the first movement track reaches the neighborhood of the first target position and the second movement track reaches the neighborhood of the second target position, and producing as a search result a video including the searched similar frame image and the searched target frame image.

7. A video search device, comprising:
a receiver for receiving input of a still image in which a reference object is depicted, a first reference position and a second reference position contained in a reference region in which the reference object in the still image is depicted, and a first target position and a second target position within a frame image contained in a video;
an extractor for extracting a reference image depicted in the reference region based on the first reference position and the second reference position; and
a searcher for searching for similar frame images that are frame images contained in videos and in which local images similar to the reference image are depicted, finding a first start position and a second start position corresponding to the first reference position and the second reference position in the reference region, in a local region in which the local image is depicted in the searched similar frame image, tracing a first movement track along which a first noteworthy pixel depicted at the first start position moves in the searched similar frame image and a second movement track along which a second noteworthy pixel depicted at the second start position moves, by scanning frame images contained in the video including the searched similar frame image in the chronological progress or retrogression direction from the searched similar frame image, and searching a target frame image at which the first movement track reaches the neighborhood of the first target position and the second movement track reaches the neighborhood of the second target position.

8. A video search method comprising the steps of:
receiving input of a still image in which a reference object is depicted, a first reference position and a second reference position contained in a reference region in which the reference object in the still image is depicted, and a first target position and a second target position within a frame image contained in a video;
extracting a reference image depicted in the reference region based on the first reference position and the second reference position; and
searching for similar frame images that are frame images contained in videos and in which local images similar to the reference image are depicted, finding a first start position and a second start position corresponding to the first reference position and the second reference position in the reference region, in a local region in which the local image is depicted in the searched similar frame image, tracing a first movement track along which a first noteworthy pixel depicted at the first start position moves in the searched similar frame image and a second movement track along which a second noteworthy pixel depicted at the second start position moves, by scanning frame images contained in the video including the searched similar frame image in the chronological progress or retrogression direction from the searched similar frame image, and searching a target frame image at which the first movement track reaches the neighborhood of the first target position and the second movement track reaches the neighborhood of the second target position.

* * * * *